US012687513B2

(12) United States Patent
Mcclean et al.

(10) Patent No.: US 12,687,513 B2
(45) Date of Patent: Jul. 21, 2026

(54) COOKING APPLIANCE AND HUMIDITY SENSOR FOR SAME

(71) Applicant: Breville Pty Limited, Alexandria (AU)

(72) Inventors: Stephen John Mcclean, Alexandria (AU); Duncan Bruce Hellmers, Alexandria (AU); Johnson Thie, Alexandria (AU)

(73) Assignee: BREVILLE PTY LIMITED, Alexandria (AU)

( * ) Notice: Subject to any disclaimer, the term of this patent is extended or adjusted under 35 U.S.C. 154(b) by 55 days.

(21) Appl. No.: 18/577,753

(22) PCT Filed: Jul. 28, 2022

(86) PCT No.: PCT/AU2022/050799
§ 371 (c)(1),
(2) Date: Jan. 9, 2024

(87) PCT Pub. No.: WO2023/004464
PCT Pub. Date: Feb. 2, 2023

(65) Prior Publication Data
US 2024/0337616 A1 Oct. 10, 2024

(30) Foreign Application Priority Data
Jul. 28, 2021 (AU) ................................ 2021902318

(51) Int. Cl.
*G01N 27/22* (2006.01)
(52) U.S. Cl.
CPC .................................. *G01N 27/223* (2013.01)
(58) Field of Classification Search
None
See application file for complete search history.

(56) References Cited

U.S. PATENT DOCUMENTS 10,948,448 B2 * 3/2021 Nakane ................ G01N 27/048
2007/0210807 A1 * 9/2007 Arisaka ................ G01N 27/225
324/664
2011/0179861 A1 7/2011 Grange et al.

FOREIGN PATENT DOCUMENTS

CN 208076442 U 11/2018
CN 108852013 B * 11/2020 .............. A47J 36/00
(Continued)

OTHER PUBLICATIONS

International Search Report and Written Opinion dated Oct. 18, 2022, for PCT/AU2022/050799 (15 pages).
(Continued)

*Primary Examiner* — Rodney E Fuller
(74) *Attorney, Agent, or Firm* — KDW FIRM PLLC

(57) ABSTRACT

Example embodiments of a humidity sensor for a cooking appliance are provided. The humidity sensor comprises: a sensor assembly comprising: conductive plates having a space located therebetween, wherein the conductive plates are electrically charged and subsequently discharged over time; a dielectric plate locatable in the space between the conductive plates, wherein the dielectric plate is removable from the space between the conductive plates for cleaning; a controller, in electrical communication with the sensor assembly, configured to: measure a capacitive characteristic across the conductive plates whilst the dielectric plate is located in the space; and determine, based on the capacitive characteristic, a humidity measurement indicative of the humidity within the cooking appliance.

18 Claims, 7 Drawing Sheets

(56) References Cited

FOREIGN PATENT DOCUMENTS

| CN | 112268941 | A |   | 1/2021 |   |   |
|----|-----------|---|---|--------|---|---|
| EP | 1736054 | A2 |   | 12/2006 |   |   |
| EP | 2840318 | A1 | * | 2/2015 | ............ | F24C 15/327 |
| EP | 3453977 | B1 | * | 8/2020 | ............ | G05D 27/02 |
| KR | 102107353 | B1 |   | 5/2020 |   |   |
| RU | 2167414 | C1 | * | 5/2001 |   |   |

OTHER PUBLICATIONS

European Search Report for EP Application No. EP22847721, dated Apr. 11, 2025, 5 pages.

* cited by examiner

COOKING APPLIANCE AND HUMIDITY SENSOR FOR SAME

This application is a National Stage Application in the U.S. filed under 35 U.S.C. § 371 of pending International Application No. PCT/AU2022/050799 filed on 28 Jul. 2022, which claims priority to Australian Provisional Patent Application No. 2021902318 filed 28 Jul. 2021, the contents of which are incorporated herein in their entirety by reference.

FIELD

The present invention relates to a cooking appliance and a humidity sensor for a cooking appliance.

BACKGROUND

Current humidity sensors integrated with cooking appliances, such as a domestic oven, are relatively expensive devices which can become fouled with oil, grease, or the like. This can impact the accuracy of the humidity sensor. However, the integrated design of the humidity sensor cannot be easily dismantled for cleaning to correct for the change in accuracy. Whilst cheaper humidity sensors are available which are not integrated with cooking appliances, these non-integrated sensors are generally not designed for cooking temperatures and thus are not suitable for such use.

SUMMARY

It is an object of the present invention to substantially overcome or at least ameliorate one or more disadvantages of existing arrangements.

In a first aspect, there is provided a humidity sensor for a cooking appliance, comprising: a sensor assembly comprising: conductive plates having a space located therebetween, wherein the conductive plates are electrically charged and subsequently discharged over time; a dielectric plate locatable in the space between the conductive plates, wherein the dielectric plate is removable from the space between the conductive plates for cleaning; a controller, in electrical communication with the sensor assembly, configured to: measure a capacitive characteristic of the conductive plates whilst the dielectric plate is located in the space; and determine, based on the capacitive characteristic, a humidity measurement indicative of the humidity within the cooking appliance.

In certain embodiments, the cooking appliance includes a body having a cavity and a closure, wherein movement of the closure from a closed position to an open position causes the dielectric plate to be removed from the space between the conductive plates.

In certain embodiments, the conductive plates move away from each other to provide clearance for the dielectric plate to be removed from the space located between the conductive plates.

In certain embodiments, movement of the closure from the open position to the closed position causes the dielectric plate to be located in the space between the conductive plates.

In certain embodiments, the conductive plates move toward each other during or after the dielectric plate is located between the conductive plates.

In certain embodiments, the conductive plates are coupled within the cavity of the cooking appliance and the dielectric plate is coupled to the closure of the cooking appliance.

In certain embodiments, the conductive plates are coupled to the closure of the cooking appliance and the dielectric plate is coupled within the cavity of the cooking appliance.

In certain embodiments, the closure is a door of the cooking appliance.

In certain embodiments, the capacitive characteristic is a period of charging to a first voltage level across the conductive plates and subsequently discharging to a second voltage level across the conductive plates.

In certain embodiments, the dielectric plate has opposing faces, wherein one of the faces has a grooved surface defined by a plurality of grooves extending across the respective face of the dielectric plate.

In certain embodiments, each groove has a width between approximately 0.5 millimetres to approximately 1 millimetre.

In certain embodiments, each groove has a width of approximately 1 millimetre.

In certain embodiments, each groove has a depth between approximately 0.5 millimetres to approximately 1 millimetre.

In certain embodiments, each groove has a depth of approximately 1 millimetre.

In certain embodiments, the grooves have a spacing of between approximately 2 millimetres and approximately 5 millimetres.

In certain embodiments, the grooves have a spacing of approximately 2 millimetres.

In certain embodiments, each conductor plate has planar surface which faces the dielectric plate.

In certain embodiments, the dielectric plate includes a ceramic material.

In certain embodiments, the ceramic is aluminium oxide.

In certain embodiments, the conductor plates are aluminium.

In certain embodiments, the humidity measurement indicative of the humidity within the cooking appliance is a humidity range measurement, wherein the controller is configured to determine the respective humidity range measurement which maps to the capacitive characteristic of the conductive plates based on mapping data stored in memory of the controller, wherein the mapping data is indicative of a plurality of humidity ranges mapped to respective capacitive characteristic ranges.

In a second aspect, there is provided a cooking appliance comprising a humidity sensor configured according to the first aspect and/or embodiments thereof.

In certain embodiments, the controller is configured to execute to humidity response function for the cooking appliance in response to the humidity measurement determined for the cooking appliance.

In certain embodiments, the cooking appliance is an oven.

BRIEF DESCRIPTION OF THE DRAWINGS

Example embodiments should become apparent from the following description, which is given by way of example only, of at least one preferred but non-limiting embodiment, described in connection with the accompanying figures.

DETAILED DESCRIPTION

Figure 1:
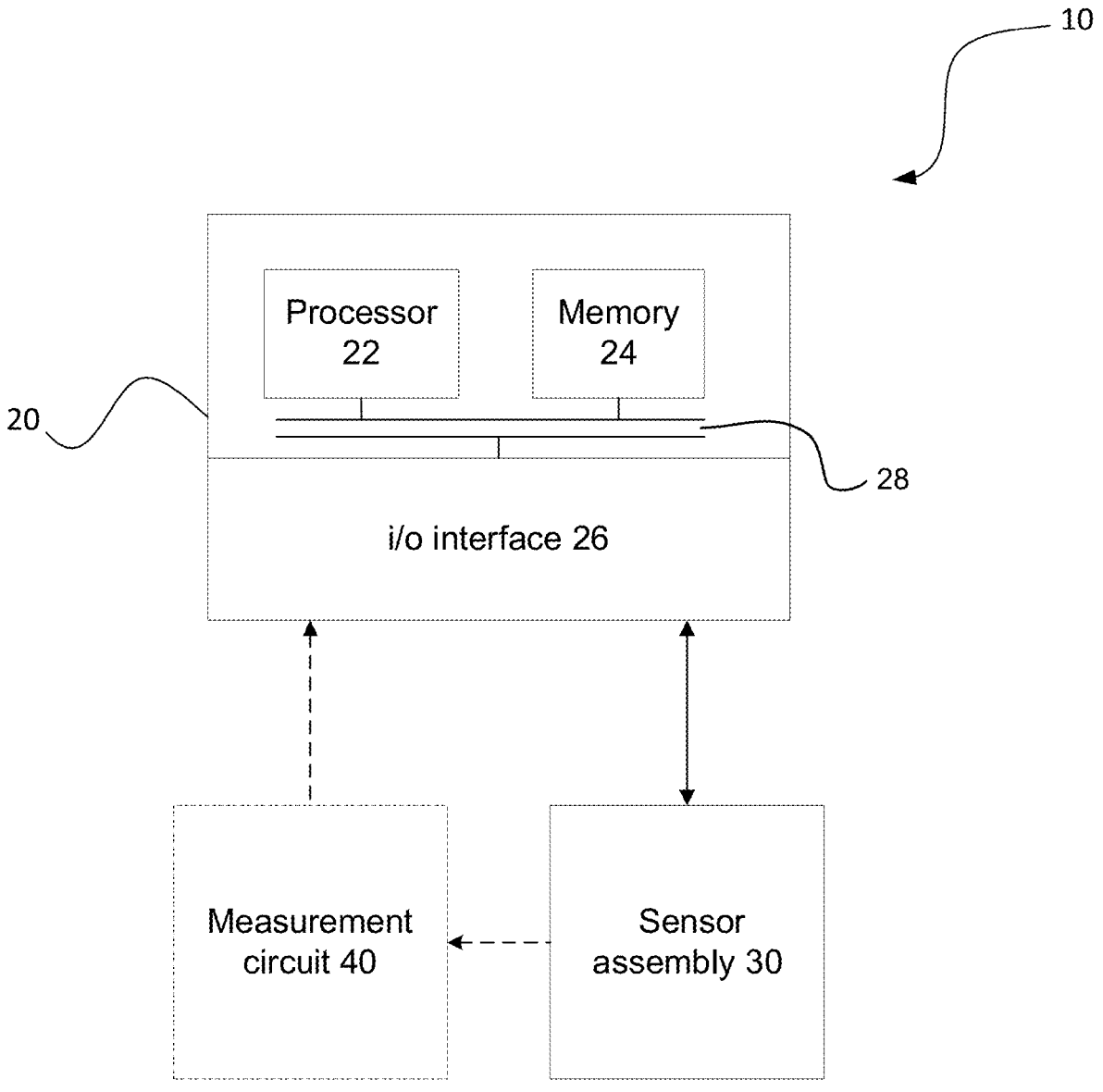
FIG. 1 is a schematic of an example of a humidity sensor for a cooking appliance.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices which form public knowledge through their respective publication and/or use. Such should not be interpreted as a representation by the present inventor(s) or the patent applicant that such documents or devices in any way form part of the common general knowledge in the art.

Referring to FIG. 1, there is shown a schematic of a humidity sensor 10 for a cooking appliance 100. The humidity sensor 10 comprises a sensor assembly 30 and a controller 20 in electrical communication with the sensor assembly 30.

Figure 2A:
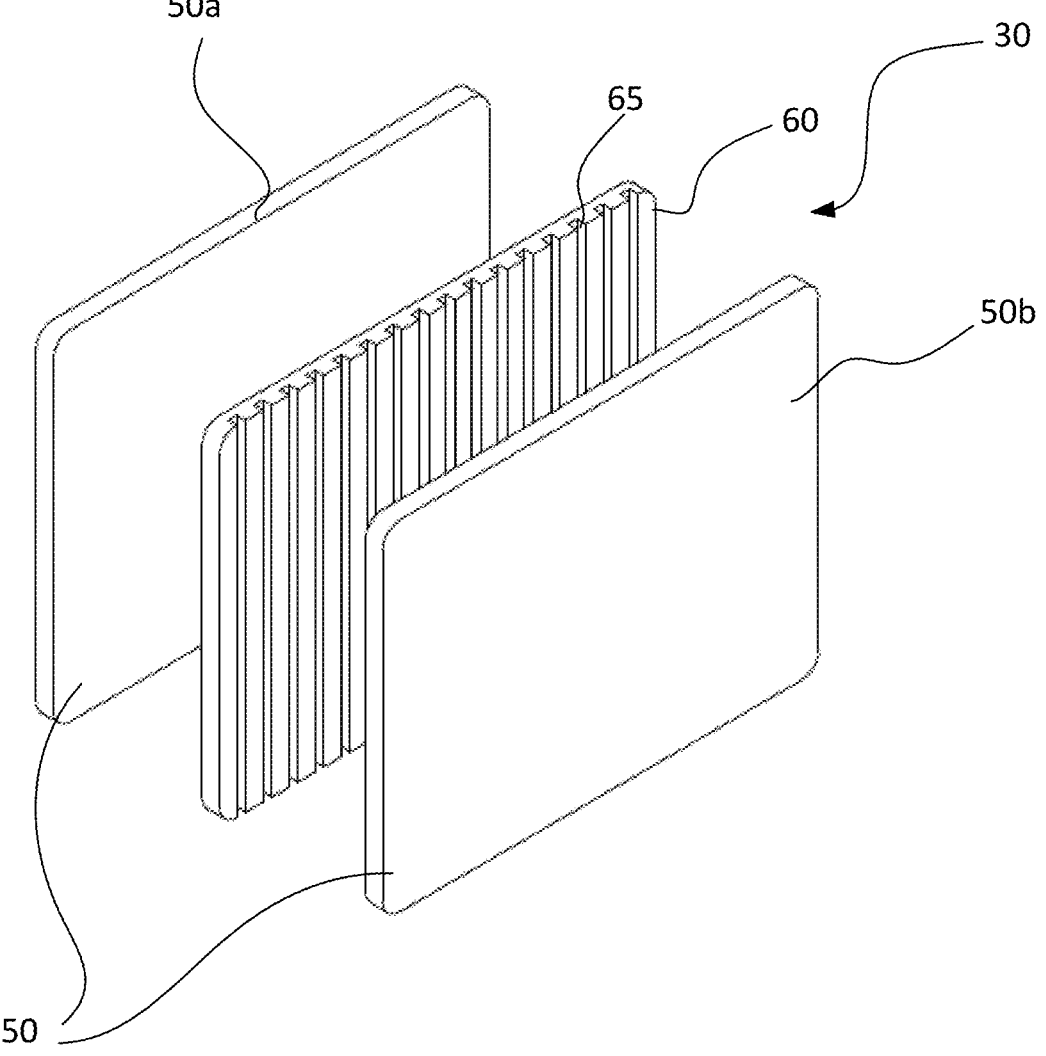
FIG. 2A is an exploded isometric view of an example sensor assembly of the humidity sensor of FIG. 1.
Figure 2B:
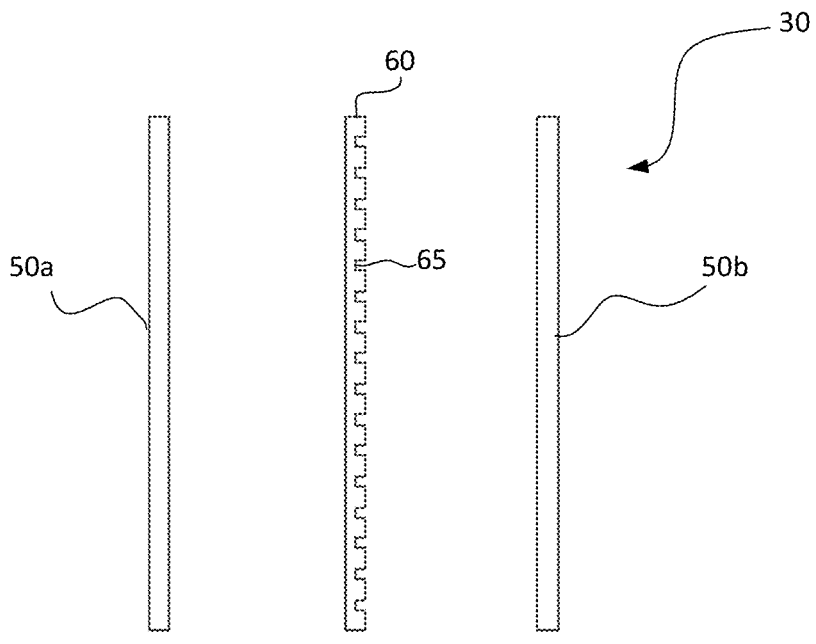
FIG. 2B is an exploded plan view of the sensor assembly of FIG. 3.
Figure 2C:
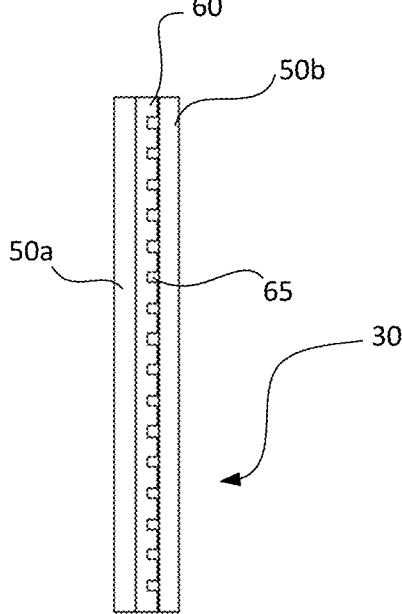
FIG. 2C is a plan view of the sensor assembly of FIG. 3.

Referring to FIGS. 2A to 2C, the sensor assembly 30 comprises of a pair of conductive plates 50a, 50b (collectively referred to by reference 50) having a space located therebetween. The conductive plates 50 are electrically charged and subsequently discharged over time. In one form, an electrical power source such as a DC voltage source is applied across the conductive plates 50 for charging. In one form, the controller 20 can provide the electrical power via the i/o interface 26 to the sensor assembly 30. However, a different device, such as a dedicated power source, may provide the electrical power to the sensor assembly 30. The sensor assembly 30 further comprises a dielectric plate 60 locatable in the space between the conductive plates 50. The dielectric plate 60 is removable from the space between the conductive plates 50 to allow for cleaning.

The controller 20 is configured to measure a capacitive characteristic for the conductive plates 50 whilst the dielectric plate 60 is located in the space. The controller 20 is further configured to determine, based on the capacitive characteristic, a humidity measurement indicative of the humidity within the cooking appliance 100.

Advantageously, the humidity sensor 10 allows for the dielectric plate 60 to be separated from the conductive plates 50 to allow for cleaning, thereby maintaining the accuracy of the humidity sensor 10.

In an optional form, as shown by broken line in FIG. 1, the humidity sensor 10 can include a measurement circuit 40 in electrical communication with the sensor assembly 20 and the controller 20. The measurement circuit 40 will be discussed in more detail herein.

As shown in FIG. 1, the controller 20 includes a processor 22, a memory 24, and an input/output (i/o) interface 26 coupled together via a bus 28. The controller 20 can be provided in the form of a microcontroller 20. The memory 24 has stored therein executable instructions which are executed by the processor 22 to determine the humidity measurement for the cooking appliance 100.

Figure 3:
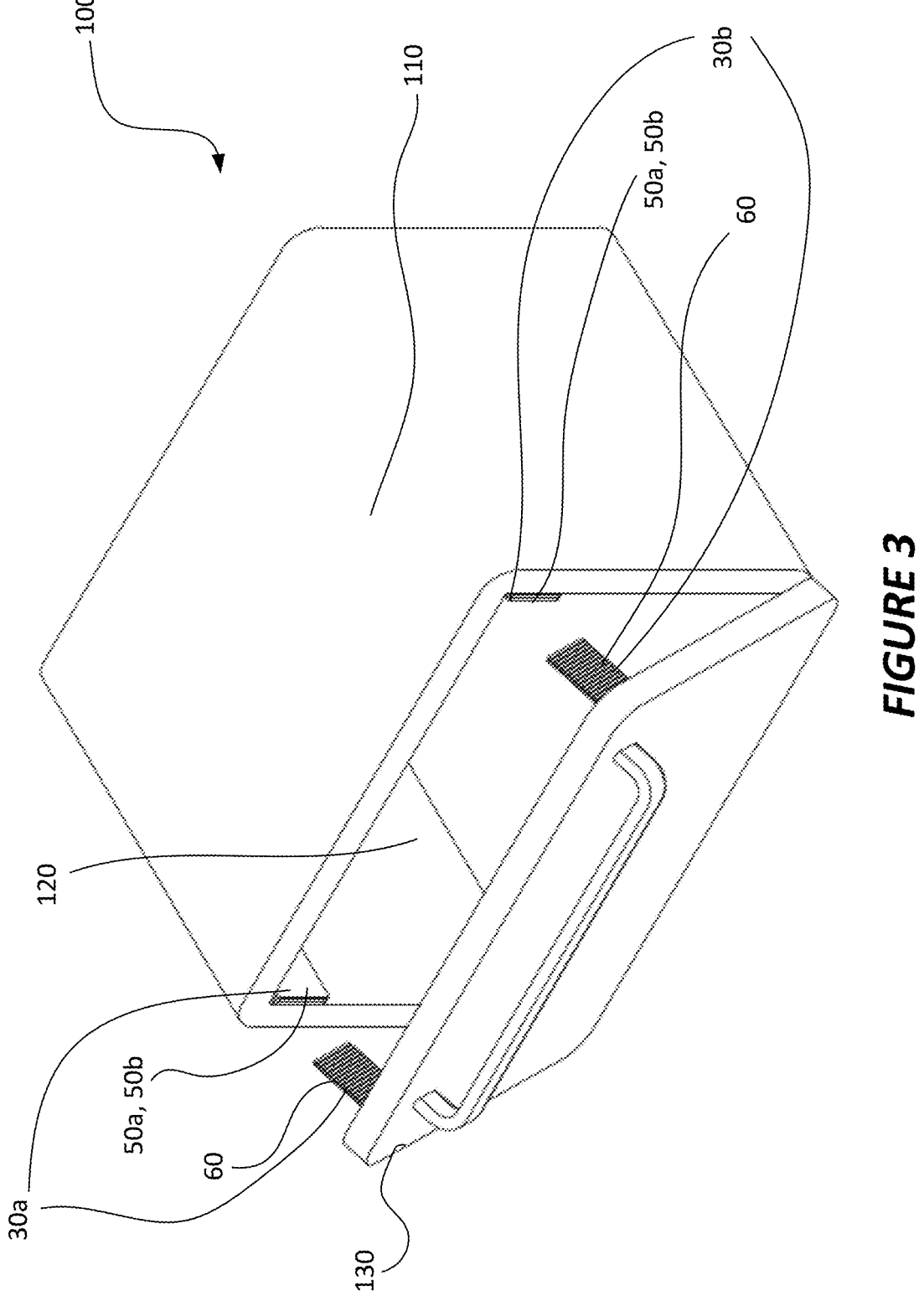
FIG. 3 is an isometric plan view of an example of a cooking appliance, including the humidity sensor of FIG. 1, with a closure in an open position.
Figure 4A:
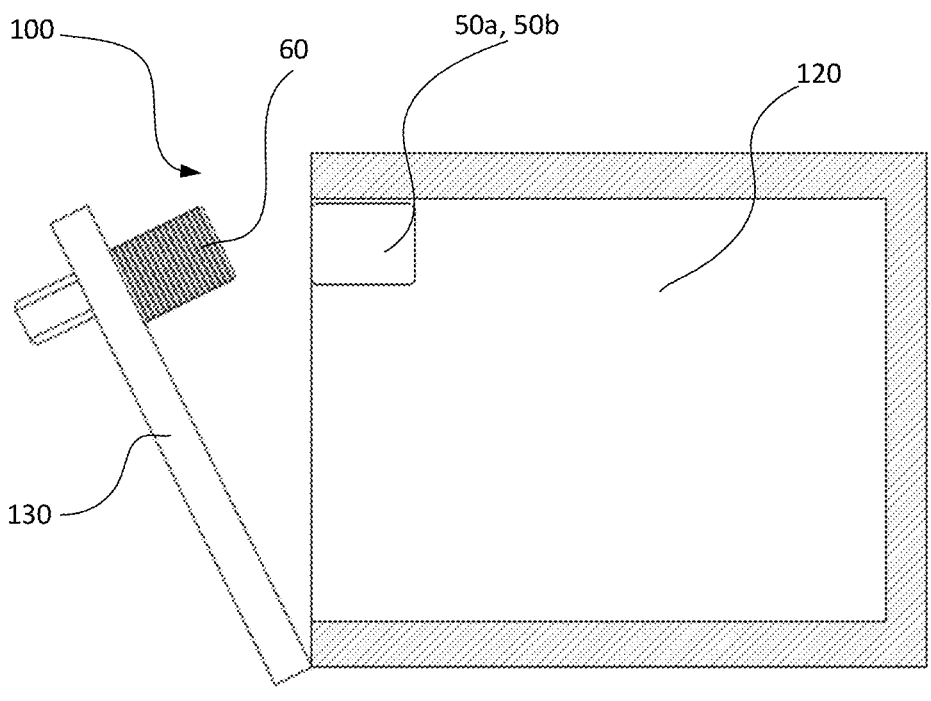
FIG. 4A is a cross-sectional side view of the cooking appliance of FIG. 4A with the closure in the open position.
Figure 4B:
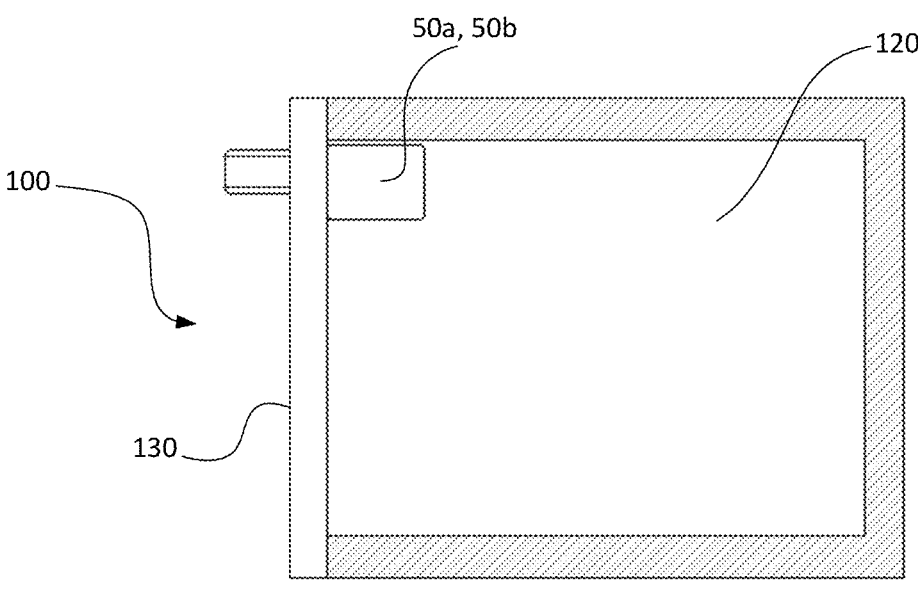
FIG. 4B is a cross-section side view of the cooking appliance of FIG. 4A with the closure in the closed position.

Referring to FIG. 3, there is shown an example of the cooking appliance 100 provided in the form of an oven 100 which includes the humidity sensor 10. The oven 100 includes a body 110 having a cavity 120 and a closure 130, such as a door 130. In one form, movement of the closure 130 from a closed position to an open position causes the dielectric plate 60 to be removed from the space between the conductive plates 50. In particular, as shown in FIGS. 4A and 4B, the dielectric plate 60 can be coupled to the closure 130 of the cooking appliance 100 and the conductive plates 50 are coupled within the cavity 120 of the cooking appliance 100. As the closure (door) 130 is opened, the dielectric plate 60 is withdrawn from the space between the conductive plates 50. Because the dielectric plate 60 is withdrawn upon opening the door 130, a user can easily visually inspect the dielectric plate 60 to see whether cleaning is required. The dielectric plate 60 is preferably releasably coupled to the door 130 such that the user can uncouple the dielectric plate 60 from the door 130 for cleaning. After cleaning, the user can recouple the dielectric plate 60 to the door 130 of the cooking appliance 100. When the door 130 is moved from the open position to the closed position, the dielectric plate 60 moves between the conductive plates 50 to reassemble the sensor assembly 30 provided in the form of a plate stack where the conductive plates 50 surround the dielectric plate 60 as shown in FIG. 2C.

It will be appreciated that a reverse configuration of the sensor assembly 30 for the cooking appliance 100 is possible wherein the dielectric plate 60 is coupled within the cavity 120 of the cooking appliance 100 and the conductive plates 50 are coupled to the closure 130 of the cooking appliance 100. In this configuration, when the door 130 is opened, the conductive plates 50 move relative to the stationary dielectric plate 60 such that the conductive plates 50 are withdrawn from the cavity 120 with the door 130 thereby uncovering the dielectric plate 60 when the door 130 is located in the open position. In this configuration, the dielectric plate 60 can be inspected by the user, releasably decoupled if required and withdrawn from within the cavity 120 for cleaning. Once cleaned, the dielectric plate 60 can be releasably recoupled within the cavity 120. Upon the door 130 being closed, the conductive plates 50 surround and align with the dielectric plate 60 thereby reassembling the sensor assembly 30.

It will also be appreciated that in additional or alternate embodiments, the conductive plates 50 could be releasably decoupled from within the cavity 120 or the door 130 of the cooking appliance 100 for cleaning.

As it is preferable that inner faces of the conductive plates 50 are closely located adjacent the respective outer face of the dielectric plate 60 in a face-to face configuration, the conductive plates 50 can be configured to move away from and toward each other during withdrawal from and insertion of the dielectric plate 60 between the conductive plates 50. In particular, the conductive plates 50 can be configured to move away from each other when the door 130 is opened to provide clearance for the dielectric plate 60 to be removed from the space located between the conductive plates 50. Similarly, the conductive plates 50 are configured to move toward each other during or after the dielectric plate 60 is located between the conductive plates 50 to provide clearance for the dielectric is be located between the conductive plates 50.

The cooking appliance 100 may include multiple sensor assemblies 30. For example, in FIG. 3, the oven 100 includes a first sensor assembly 30a located at the upper left corner of the cavity 120 of the body 110 of the oven 100, and a second sensor assembly 30b located at the upper right corner of the body 110 of the oven 100. The controller 20 can be in electrical communication with both sensor assemblies 30a, 30b and determine multiple humidity measurements for different portions of the cavity 120 of the cooking appliance 100 or use an output signal received from both sensor assemblies 30 to generate a single averaged humidity measurement for the cavity 120 of the cooking appliance 100.

Referring to FIGS. 1A to 2B, there is shown various views of the sensor assembly 30 of the humidity sensor 10 of FIG. 1.

The dielectric plate 60 has two opposing faces. One of the faces of the dielectric plates 60 includes a plurality of grooves 65 extending across the respective face. The plurality of grooves 65 are parallel with each other. Each groove 65 has a width between approximately 0.5 millimetres to approximately 1 millimetre, and preferably a width of approximately 1 millimetre. Furthermore, each groove 65 has a depth between approximately 0.5 millimetres to approximately 1 millimetre, and preferably a depth of approximately 1 millimetre. Neighbouring grooves 65 have a spacing of therebetween of approximately 2 millimetres and approximately 5 millimetres, and preferably approximately 2 millimetres. The dielectric plate 60 includes a ceramic material such as aluminium oxide. It will be appreciated that other ceramic materials can be used, such as tin-oxide.

Each conductor plate 50 is a solid plate having opposing planar surfaces. An inner face of a first conductor plate 50a faces the non-grooved surface of the dielectric plate 60 in the assembled state. An inner face of a second conductor plate 50b faces the grooved surface of the dielectric plate 60 in the assembled state. Each conductor plate 50 is preferably made from aluminium. In an alternate form, each conductor plate 50 can have a mesh surface, wherein a plurality of holes (e.g. ~1 millimetre to 2 millimetres in diameter) extend through the conductor plate 50 (i.e. between faces) to define the mesh surface.

Figure 5:
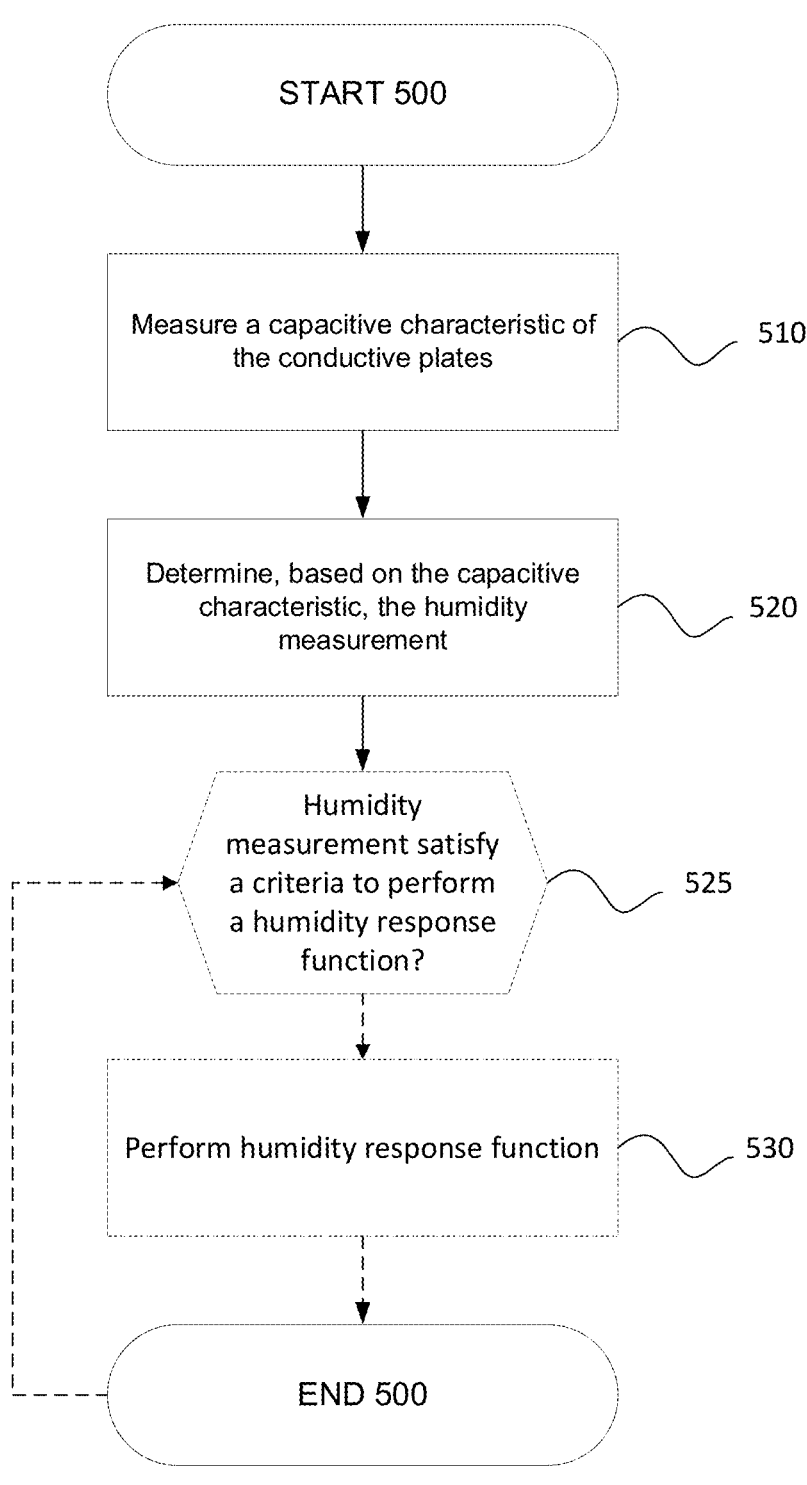
FIG. 5 is a flowchart representing a method for determining a humidity measurement using the humidity sensor of FIG. 1.

Referring to FIG. 5, there is shown a flowchart representing a method 500 performed by the controller 20 to determine a humidity measurement indicative of a humidity within the cooking appliance 100.

In particular, at step 510, the method 500 includes the controller 20 measuring a capacitive characteristic of the conductive plates 50 whilst the dielectric plate 60 is located within the space between the conductive plates 50. In one form, the humidity measurement indicative of the humidity within the cooking appliance 100 is a humidity range measurement. More specifically, the controller 20 is configured to determine the respective humidity range measurement which maps to the capacitive characteristic of the conductive plates 50 based on mapping data stored in memory 24 of the controller 20. The mapping data is indicative of a plurality of humidity ranges, wherein each humidity range is mapped to a respective capacitive characteristic range.

At step 520, the method 500 includes the controller 20 determining, based on the capacitive characteristic, the humidity measurement indicative of the humidity within the cooking appliance 100. As mentioned above, the humidity measurement is a humidity range measurement. For example, the memory 24 of the controller 20 can store mapping data which maps a first capacitive characteristic range to a first humidity range (e.g. 0% to 30% humidity), a second capacitive characteristic range to a second humidity range (e.g. 31% to 70% humidity), and a third capacitive characteristic range to a third humidity range (71% to 100% humidity).

At optional step 530, the method 500 includes the controller 20 determining whether a criteria has been met based on the humidity measurement to perform a humidity response function. In response to the criteria being met, the method 500 proceeds to step 540, otherwise the method 500 ends.

At step 540, the method 500 includes performing a humidity response function. For example, the cooking appliance 100 may include an electrical display in electrical communication with the i/o interface 26 of the controller 20. The controller 20 can generate an output signal to control the electrical display device to display the measured humidity. In an additional or alternate form, the cooking appliance 100 may be configured to adjust a cooking temperature in response to a detected humidity measurement. In response to determining a humidity measurement which satisfies a change in temperature threshold, the controller 20 can generate a control signal to adjust the temperature of a heating element of the cooking appliance 100, thereby adjusting the temperature of the cooking appliance 100.

In a preferable form, the capacitive characteristic is a temporal period of charging across the conductive plates 50 to a first voltage level and subsequently discharging the charge across the conductive plates 50 to a second voltage level. Thus, the temporal period is both an initial charging period of time and a subsequent discharging period of time for the conductive plates 50. In this embodiment, the mapping data stored in the memory 24 of the controller 20 is indicative of a mapping between a first temporal period (e.g., 190 to 200 milliseconds) of charge and discharge of the conductive plates 50 and a first humidity range (e.g. 0% to 30% humidity), a second temporal period (e.g., 195 to 210 milliseconds) of charge and discharge of the conductive plates 50 and a second humidity range (e.g. 31% to 70% humidity), and a third temporal period (e.g., 200 to 220 milliseconds) of charge and discharge of the conductive plates 50 and a third humidity range (e.g. 71% to 100% humidity).

Figure 6:
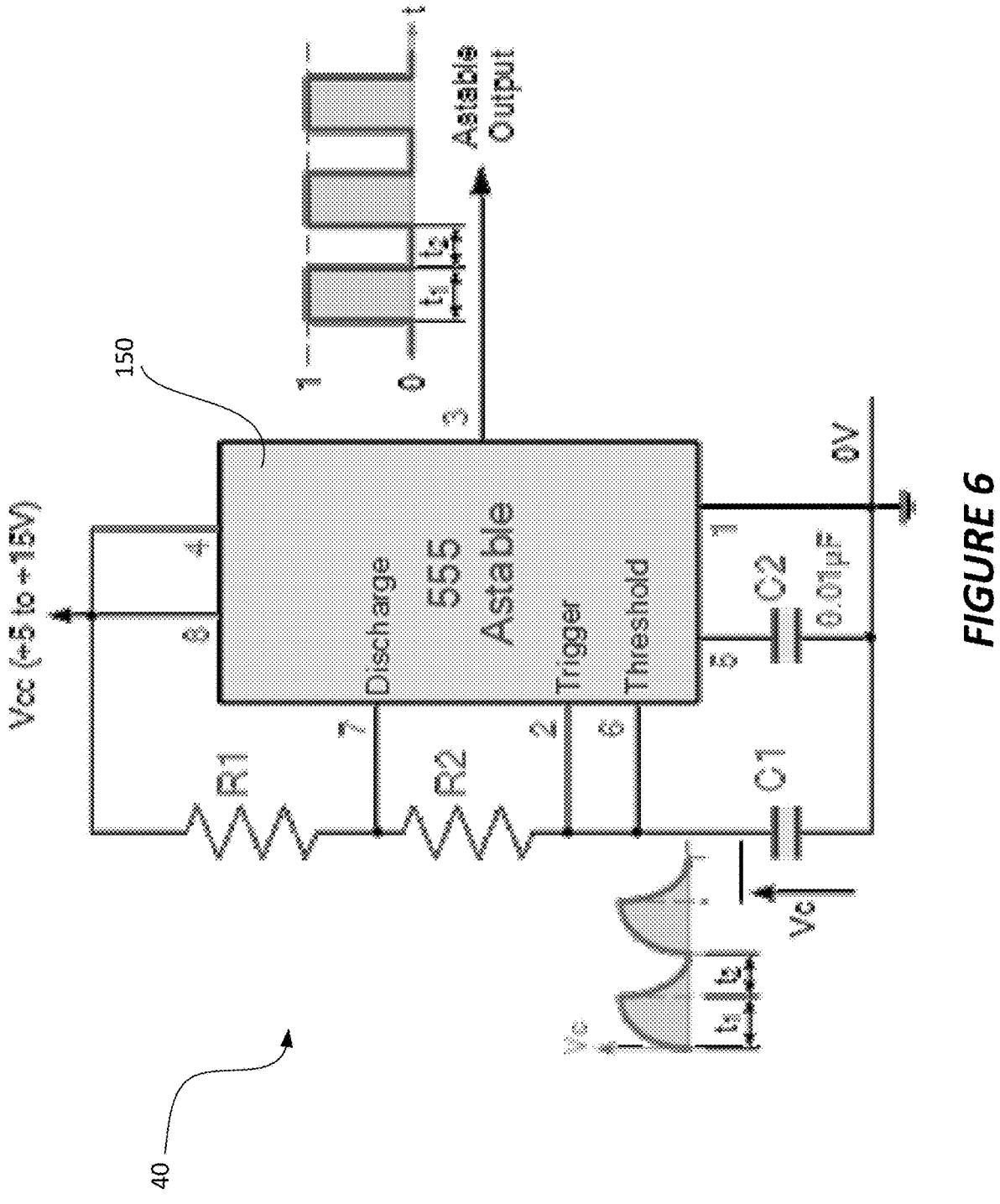
FIG. 6 is an example of a circuit diagram for determining a humidity measurement using the humidity sensor of FIG. 1.

Referring to FIG. 6, there is shown a measurement circuit 40 which can be in electrical communication with the conductive plates 50 of the sensor assembly 30 and the i/o interface 26 of the controller 20. More specifically, the sensor assembly 30 is shown as capacitor C1, where one of the conductive plates 50 is connected to ground while the other conductive plate is electrically connected to a timer circuit including a 555 integrated circuit (chip). The 555 chip monitors the voltage across the conductive plates. In particular, the 555 chip has comparators that monitor the voltage across the conductive plates that act as a capacitor. The conductive plates are powered by a DC voltage. During charging, the capacitor charges up to a preset upper voltage level, then the conductive plates are subsequently discharged through a transistor of the 555 chip. When voltage across the conductive plates has dropped to a preset lower level, the charging cycle begins again. A first resistor R1 of known resistance is connected between a DC voltage source and a discharge pin of the timer circuit. A second resistor R2 of known resistance is connected between the discharge pin of the timer circuit and a trigger pin of the timer circuit. In one form, the first resistor is 10 kΩ and the second resistor is 1 MΩ. A second capacitor C2 is connected between control voltage pin of the timer circuit and ground to level out any fluctuations in supply voltage. The 555 chip generates an output signal at an output pin which can be in electrical communication with the i/o interface 26 of the controller 20. Due to the resistance of R1 and R2 being fixed and known, the timer period is proportional to the capacitance of the sensor assembly 30. As shown in FIG. 6, an output signal is generated at the output pin of the timer circuit, wherein a period of the output signal is the temporal period of the charging and discharging of the sensor assembly 30. The controller 20 can be configured to determine the period of the output signal generated by the timer circuit and received via the i/o interface 26, then determine the appropriate temporal range which the determined period falls within and then determine the respective humidity measurement range indicated by the mapping data stored in memory 24 of the controller 20.

Although specific embodiments of the invention are illustrated and described herein, it will be appreciated by those of ordinary skill in the art that a variety of alternative and/or equivalent implementations exist. It should be appreciated that the exemplary embodiment or exemplary embodiments are examples only and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

It will also be appreciated that in this document the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", etc. are used merely as labels, and are not intended to impose numerical requirements on or to establish a certain ranking of importance of their objects.

The invention claimed is:

1. A humidity sensor for a cooking appliance, comprising:
a sensor assembly comprising:
   conductive plates having a space located therebetween, wherein the conductive plates are electrically charged and subsequently discharged over time;
   a dielectric plate locatable in the space between the conductive plates, wherein the dielectric plate is removable from the space between the conductive plates for cleaning;
a controller, in electrical communication with the sensor assembly, configured to:
   measure a capacitive characteristic across the conductive plates whilst the dielectric plate is located in the space; and
   determine, based on the capacitive characteristic, a humidity measurement indicative of the humidity within the cooking appliance.

2. The humidity sensor according to claim 1, wherein the cooking appliance includes a body having a cavity and a closure, wherein movement of the closure from a closed position to an open position causes the dielectric plate to be removed from the space between the conductive plates.

3. The humidity sensor according to claim 2, wherein movement of the closure from the open position to the closed position causes the dielectric plate to be located in the space between the conductive plates.

4. The humidity sensor according to claim 2, wherein the conductive plates are coupled within the cavity of the cooking appliance and the dielectric plate is coupled to the closure of the cooking appliance.

5. The humidity sensor according to claim 2, wherein the conductive plates are coupled to the closure of the cooking appliance and the dielectric plate is coupled within the cavity of the cooking appliance.

6. The humidity sensor according to claim 2, wherein the closure is a door of the cooking appliance.

7. The humidity sensor according to claim 1, wherein the capacitive characteristic is a period of charging to a first voltage level across the conductive plates and subsequently discharging to a second voltage level across the conductive plates.

8. The humidity sensor according to claim 1, wherein the dielectric plate has opposing faces, wherein one of the faces has a grooved surface defined by a plurality of grooves extending across the respective face of the dielectric plate.

9. The humidity sensor according to claim 8, wherein each groove has a width between approximately 0.5 millimetres to approximately 1 millimetre.

10. The humidity sensor according to claim 9, wherein each groove has a depth between approximately 0.5 millimetres to approximately 1 millimetre.

11. The humidity sensor according to claim 8, wherein the grooves have a spacing of between approximately 2 millimetres and approximately 5 millimetres.

12. The humidity sensor according to claim 11, wherein the ceramic is aluminum oxide.

13. The cooking appliance according to claim 12, wherein the controller is configured to execute to humidity response function for the cooking appliance in response to the humidity measurement determined for the cooking appliance.

14. The humidity sensor according to claim 1, wherein each conductive plate has planar surface which faces the dielectric plate.

15. The humidity sensor according to claim 1, wherein the dielectric plate includes a ceramic material.

16. The humidity sensor according to claim 1, wherein the conductor plates are aluminum.

17. The humidity sensor according to claim 1, wherein the humidity measurement indicative of the humidity within the cooking appliance is a humidity range measurement, wherein the controller is configured to determine the respective humidity range measurement which maps to the capacitance measured across the conductive plates based on mapping data stored in memory of the controller, wherein the mapping data is indicative of a plurality of humidity ranges mapped to respective capacitive characteristic ranges.

18. A cooking appliance comprising a humidity sensor configured according to claim 1.

\* \* \* \* \*